(12) United States Patent
Wong

(10) Patent No.: US 7,113,479 B2
(45) Date of Patent: Sep. 26, 2006

(54) AGGREGATED RATE CONTROL METHOD AND SYSTEM

(75) Inventor: David Wong, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 1026 days.

(21) Appl. No.: 10/157,867

(22) Filed: May 31, 2002

(65) Prior Publication Data

US 2003/0223414 A1   Dec. 4, 2003

(51) Int. Cl.
- *G01R 31/08* (2006.01)
- *G08C 15/00* (2006.01)
- *H04J 1/16* (2006.01)

(52) U.S. Cl. .................. 370/235; 370/230; 370/235; 370/235.1; 370/237; 370/389; 370/391; 370/392; 370/475; 709/226; 709/228; 709/232

(58) Field of Classification Search ............. None
See application file for complete search history.

(56) References Cited

U.S. PATENT DOCUMENTS 5,828,653 A   10/1998   Goss

2002/0188732 A1*   12/2002   Buckman et al. ........... 709/228
2003/0065809 A1*    4/2003   Byron ......................... 709/232

FOREIGN PATENT DOCUMENTS

| EP | 859492 | 8/1998 |
|---|---|---|
| WO | 99/00949 | 1/1999 |

* cited by examiner

*Primary Examiner*—Chi Pham
*Assistant Examiner*—Raj Jain
(74) *Attorney, Agent, or Firm*—Squire, Sanders & Dempsey L.L.P.

(57) ABSTRACT

A network device, which includes a plurality of network ports, a switching unit, a data classification unit, and a rate control unit, is provided. The plurality of network ports is configured to send and receive input data packets. The switching unit is coupled to the plurality of network ports and is configured to switch input data packets from a first port to a second port. The rate control unit is coupled to the switching unit and configured to control a data rate provided to each port of the plurality of network ports. The data classification unit is coupled to the switching unit and to the rate control unit. The data classification unit is configured to classify data packets based on their contents and output a classification to the rate control unit. The rate control unit is configured to perform rate control for input data packets based on the classification of each data packet.

31 Claims, 5 Drawing Sheets

AGGREGATED RATE CONTROL METHOD AND SYSTEM

BACKGROUND OF THE INVENTION

1. Field of the Invention

This invention relates to systems and methods for rate control within a digital communications network. In particular, this invention is related to systems and methods of adjusting the rate control of a digital data within a digital communications network based upon content or type.

2. Description of the Related Art

Data networks are well known. Over the last several years, the proliferation of the Internet has had a significant impact on many industries, especially the computer industry. The Internet has grown into such an enormous structure to which virtually any large or small computer network may be connected. In fact, it is now common place for the vast majority of people to have access to the Internet, either through their business or work and/or through personal accounts. This connectivity has allowed many businesses, universities, governments, etc. to expand to provide their services via the Internet.

Most people or businesses obtain Internet access via an Internet Service Providers (ISP). ISPs provide access to the Internet for their customers usually through membership subscriptions in conjunction with service level agreements (SLAs). ISPs make at least a portion of their income on service fees such as subscription fees, on-demand provisioning of services, etc. One technique employed by ISPs is to regulate the amount of Internet bandwidth (i.e., data speed) that a customer is entitled based upon how much they pay. By regulating the amount of bandwidth available to each customer, ISPs may provide different levels or qualities of service at different rates. At the network level, this type of rate control usually is enforced via some sort of device configuration.

For example, one standard device configuration for controlling the data rate of network access (bandwidth) involves controlling the data flow at a network device, such as a switch, between the Internet and World Wide Web (WWW) and a customer. A network device may be configured to use a rate control method often referred to as the "leaky bucket." The leaky bucket method involves configuring a network device to restrict the amount of data (i.e., data packets) that a customer may receive (e.g., via a port of the network device), by tokenizing the data and setting a threshold. Data packets are assigned a number of tokens by the device based on their size, and once a customer meets the threshold assigned for a period of time, all further packets are dropped during that same period. The amount of data equal to a token, and the amount of tokens a customer is afforded maybe set by the ISP. For example, a token may be considered to be 10 Kbits. A customer may be set to 200 tokens/second, or 2 Mbits/second (Mbps). The device drops any data packets, which are received into the network to be routed to the customer and exceed this limitation.

The leaky bucket method is one well known way for an ISP to control the data rate (bandwidth) that a customer receives. However, there are several drawbacks to the leaky bucket method. Today, Internet users may order and purchase a variety of different services, such as HDTV, video on demand, music, applications, etc. Some of these services often require a large amount of bandwidth. For example, HDTV may require 12–20 Mbps of data. Dropped packets can significantly reduce the quality of such services as video. As a result, there are problems associated with implementing rate control for Internet subscribers.

For example, an ISP may limit a group of its lower paying customers to 1 Mbps bandwidth. The bandwidth may be regulated by a network device, such as a switch in the ISP's network, physically close to and/or connected to the customer's PC. Take the case where one such customer may order HDTV. In order to provide HDTV to the customer, the ISP must provision the network to provide the necessary bandwidth to deliver the HDTV. That is, if the customer is currently limited to data at a rate of 1 Mbps, then certain devices must be reconfigured to provide an increased bandwidth sufficient to provide HDTV without dropped packets. This usually entails physically configuring the network device already regulating the customer's bandwidth, such as a switch, to provide the necessary bandwidth to the customer. However, to configure a switch might include physically interfacing with the switch and programming the switch to provide the necessary bandwidth. Then, after the HDTV has been provided, interfacing with the switch again in order to reset the bandwidth to 1 Mbps for that customer.

Manually configuring a network device to change the bandwidth provided is a time consuming task, which reduces performance (i.e., delays in delivering the network service) and costs more (i.e., time=money). Accordingly, there is a need for new and improved systems and methods for controlling the data access rate of Internet customers that are more flexible in providing higher bandwidth on-demand, inexpensively.

SUMMARY OF THE INVENTION

According to an embodiment of the present invention, provided is a network device, which includes a plurality of network ports, a switching unit, a data classification unit, and a rate control unit. The plurality of network ports is configured to send and receive input data packets. The switching unit is coupled to the plurality of network ports and is configured to switch input data packets from a first port to a second port. The rate control unit is coupled to the switching unit and configured to control a data rate provided to each port of the plurality of network ports. The data classification unit is coupled to the switching unit and to the rate control unit. The data classification unit is configured to classify data packets based on their contents and output a classification to the rate control unit. The rate control unit is configured to perform rate control for input data packets based on the classification of each data packet.

According to another embodiment of the present invention, provided is a method of rate controlling data within a network. The method includes receiving a data packet destined for a customer; classifying the data packet; rate controlling the data packet based on results of the classification step; and switching the packet to the customer based on the rate controlling step.

According to another embodiment of the present invention, provided is a network device. The network device includes a plurality of ports, a switching means, a rate control means, a data classification means, and a rate control stop means. The plurality of ports is for sending a receiving input data. The switching means is for switching input data to a first port of the plurality of ports to a second port of the plurality of ports. The rate control means is for applying rate control to the input data received at the plurality of ports into the device. The data classification means is for classifying the data input. The rate control stop means is for stopping the rate control means from applying rate control to the data input based on a classification by the data classification means.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
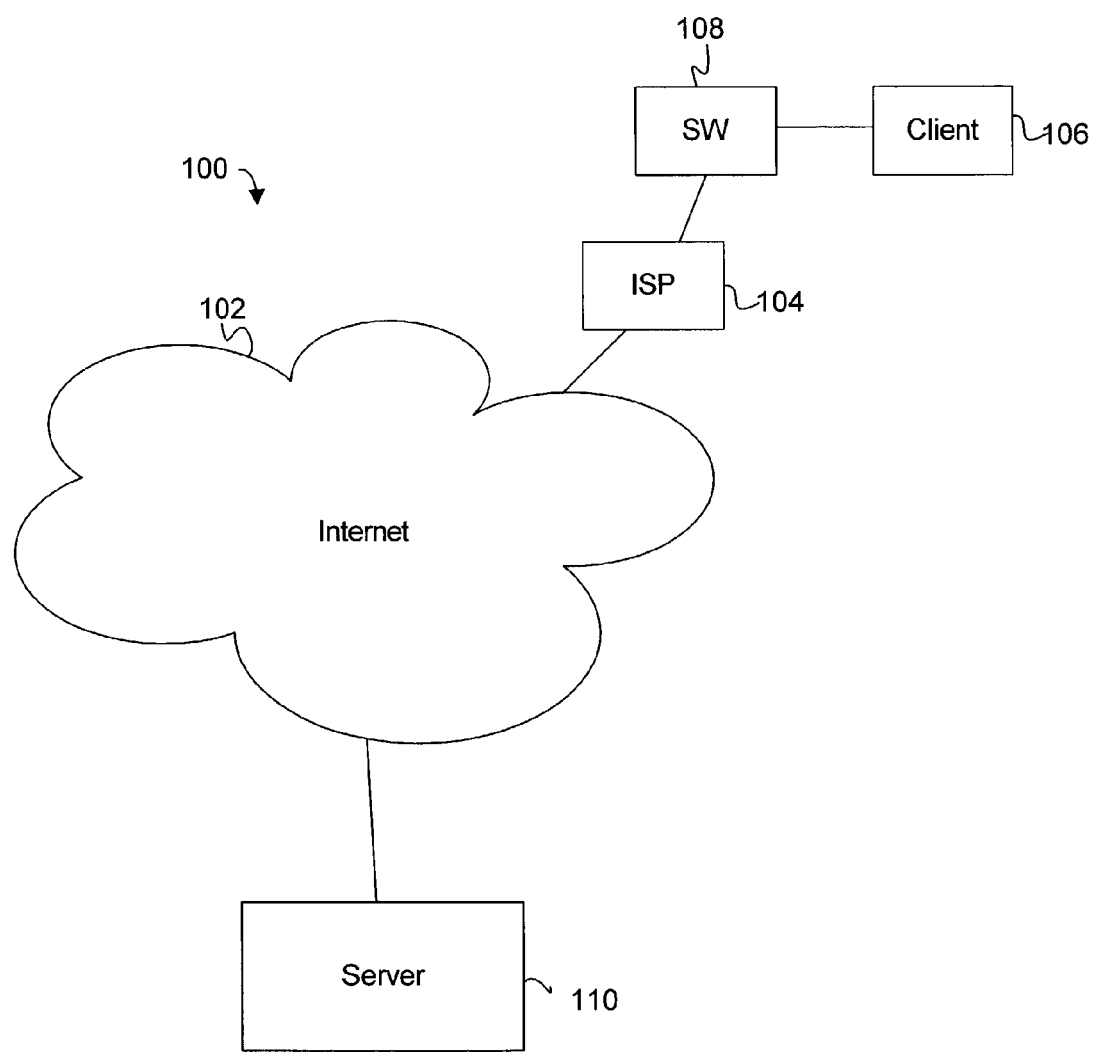
FIG. 1 is a block diagram of a network including a network device supporting aggregated rate control in accordance with an embodiment of the present invention.

FIG. 1 is a block diagram of a network including a network device supporting aggregated rate control in accordance with an embodiment of the present invention. FIG. 1 shows a network 100 which may include the Internet and World Wide Web 102. An ISP 104 (shown as a single device, but may include an entire network) is connected to the Internet 102 and may provide Internet service to a client 106 via an Ethernet link. Client 106 may be connected to a switch 108 configured and/or controlled by ISP 104. Internet content is provided to client 106 via switch 108.

In a typical configuration, ISP 104 may provide a designated amount of bandwidth to client 106 according to a service level agreement (SLA). This bandwidth may be regulated at switch 108 via built-in rate control. One standard method of rate control is the "leaky bucket" method. According to the "leaky bucket" method, client 106 may connect to a content server 110 and download some content. Switch 108 assigns a number of tokens to each data packet frame destined for client 106 (i.e., to the port connected to the client). The bandwidth is regulated in terms of the number of tokens client 106 is allowed to receive over a period of time, and the number of tokens may correspond to the size of the packet. When client 106 meets its token threshold, the rest of the packets routed to client 106 are dropped by switch 108. In this manner, the bandwidth of client 106 is regulated by switch 108. However, to cure the deficiencies in the prior art, the system and method of rate control is modified as described below.

Figure 2:
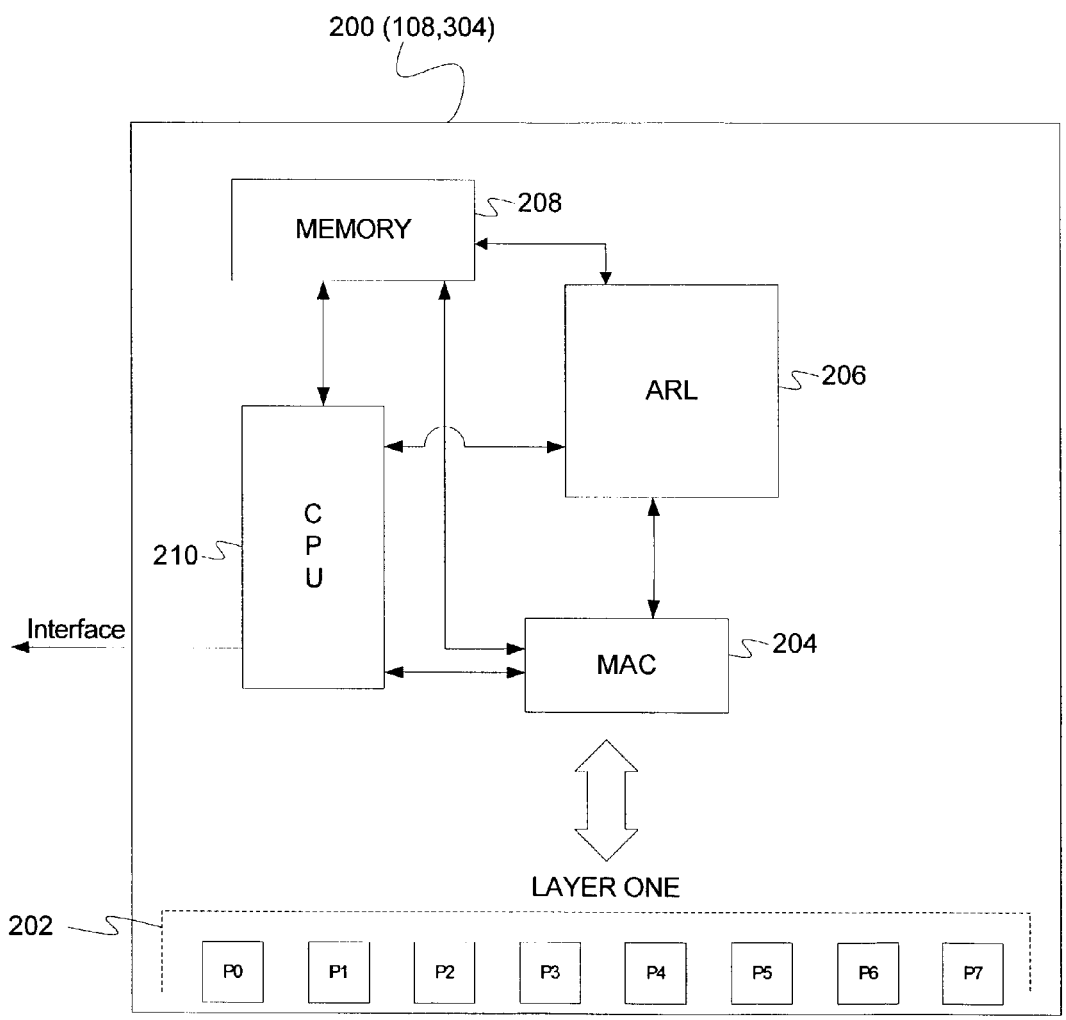
FIG. 2 is a block diagram of an exemplary network device according to an embodiment of the present invention.

FIG. 2 is a block diagram of an exemplary network device according to an embodiment of the present invention. Device 200 may be, but is not limited to, a network switch, such as switch 108 or 304, for example, and may be used within a network to control the flow of data communications to a customer. Device 200 may include a number of network ports 202 (e.g., P0–P7), which may be well known PHYs or tranceivers and perform Ethernet layer one functions. Network ports 202 are connected to network devices on one end, such as client 106, and to MAC 204 internally. MAC 204 represents an Ethernet layer two system, which interfaces the layer one systems with the upper layers of the device. MAC 204 may perform standard layer two functions in addition to those described herein.

Device 200 may also include a CPU 210 which may perform certain network functions, and which may communicate with, configure and control other systems and subsystems of device 200. Device 200 may include memory 208, which may be any number of registers, SRAM, DRAM or other memory as necessary to perform networking functions. Also, device 200 may include Address Resolution Logic (ARL) 206 for performing networking functions, such as rate control, fast filter processing (FFP) congestion control, routing, learning, etc. Accordingly, ARL 206 is connected to and may communicate with MAC 204, CPU 210 and memory 208. ARL may also be configured to pre-read ("snoop") network ports 202 in order to perform in order to support rate control according to the present invention.

Device 200 also may include a number of interfaces for directly controlling the device. These interfaces may provide for remote access (e.g., via a network) or local access (e.g., via a panel or keyboard). Accordingly, device 200 may include external interface ports, such as a USB or serial port, for connecting to external devices, or CPU 210 may be communicated with via network ports 202. In this example, interfaces are shown connected to device 200 via the CPU 210.

FIG. 2 shows an exemplary, yet very basic structure of a network device, such as a network switch. One having ordinary skill in the art will readily understand that many network devices may be used to implement the present invention. A more detailed example of an exemplary switch is shown and described in U.S. Pat. No. 6,104,696, which is hereby incorporated by reference. It should be noted that the switch described in the patent is a specific switch implementation to which the present invention is not meant to be limited. One having ordinary skill in the art will readily understand that the present invention is applicable to many other switch and device configurations.

Figure 3:
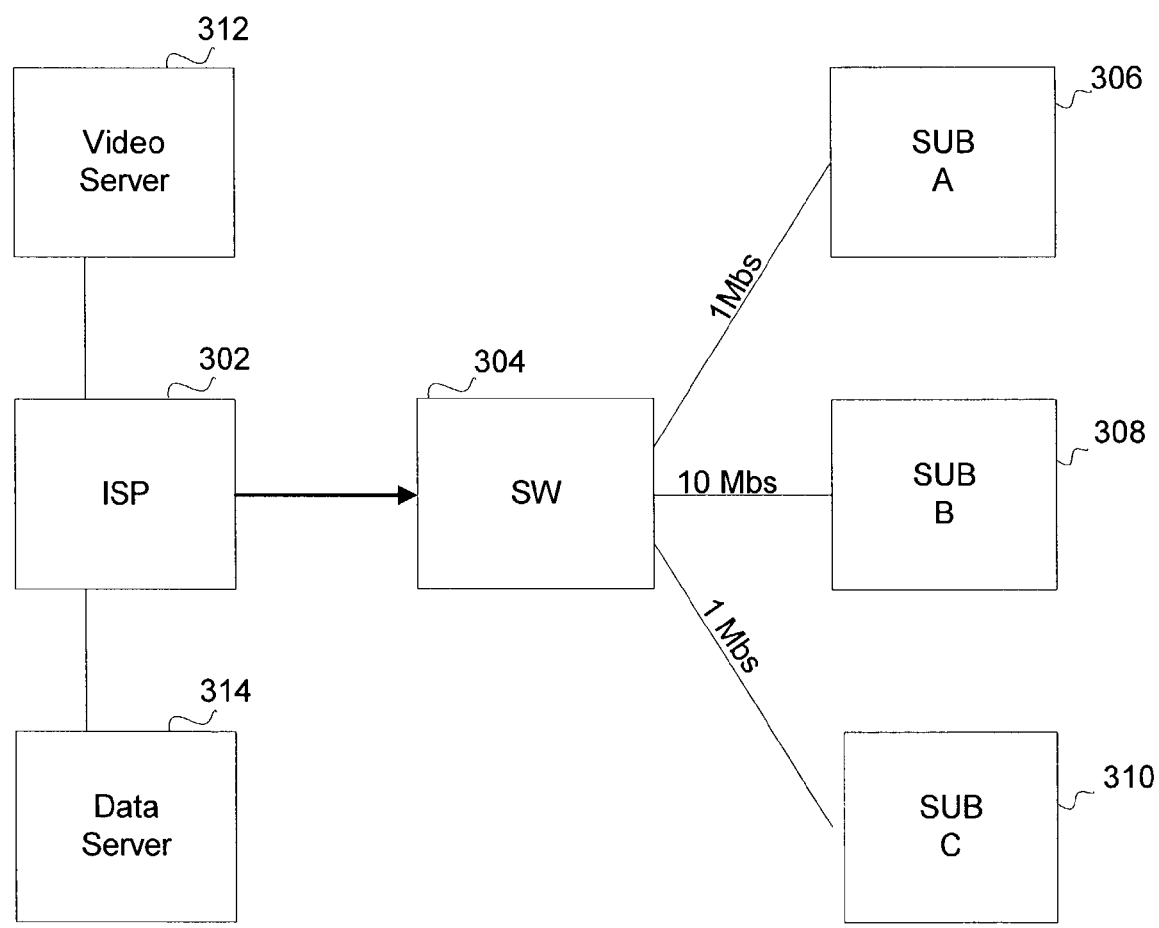
FIG. 3 is second block diagram of a network including a network device supporting aggregated rate control in accordance with an embodiment of the present invention.

FIG. 3 shows another block diagram of a network according to an embodiment of the present invention. Network 300 includes a plurality of subscribers 306–310 each connected to a switch 304. Switch 304 may be connected to the Internet via an ISP network 302. ISP 302 may be connected to a number of servers via the Internet or another network, such as to a video server 312 and data server 314. In this embodiment, it is shown that subscribers 306 and 310 each are restricted to data at a rate of 1 Mbps. Subscriber 308 is allocated data at a rate of 10 Mbps. Accordingly, subscriber 308 would be allowed 10 times as many tokens as subscribers 306 and 310 in the case when rate control is performed via the leaky bucket method. As described above, bandwidth may be allocated via the "leaky bucket" method, but is also modified as described below.

The present invention may be described in terms of a number of operational examples. Take the case where subscriber 306 wants to connect to data server 314 to download music. Subscriber 306 may navigate, such as through a browser, to a website to download music. An Ethernet connection may be made to switch 304, which routes the connection through the ISP 302 to data server 314 to request the download. Then the download is initiated, and a stream of data packets are routed back to subscriber 306 through switch 304. Subscriber 306 has a SLA with the ISP that limits its bandwidth to 1 Mbps. Accordingly, the download from data server 314 may be at a rate of no more than 1 Mbps.

As data is routed from ISP 302 to subscriber 306 via switch 304, the ARL of switch 304 may allocate tokens based on the number and size of data packets during predetermined intervals. If the data exceeds 1 Mbps, then additional data packets over the limit are dropped. Although this performance may be acceptable in some instances, it may be desirable to modify the amount of bandwidth allocated to increase performance.

In the present case, consider that the music download requires a data rate of 4 Mbps. Subscriber 308 may receive the download at the required rate under his SLA without any configuration changes to the network, but subscribers 306 and 310 cannot. If it is desired for subscribers 306 and 310 to receive the download at 4 Mbps, then the switch may automatically recognize this and provide the additional bandwidth based on the type of service requested.

Take the case where subscriber 306 orders an on-demand high definition video. Assume, for example, that HDTV requires 12 Mbps bandwidth. Under each subscriber's SLA, none of the subscribers can receive HDTV at a data rate other than the required data rate. However, if subscriber 306 purchases a video on-line, it may be desired to allow the subscriber to receive the HDTV at the required rate. Therefore, the system must allow for a bandwidth of 12 Mbps. The present invention automatically detects this need and increases the bandwidth to subscriber 306 to provide the HDTV.

Subscriber 306 may order a movie which is downloaded from video server 312. When the data packets carrying the HDTV video are received at switch 302 for routing to subscriber 306, the ARL of switch 304 may be configured to "snoop" the ports of the switch to determine the type of data being routed. The type of data may be determined from the data packet itself or from a VLAN tag which may be inserted. If the data is video or some other high bandwidth data, the switch 304 may be configured to eliminate rate control for this entire data stream. For example, if data is rate controlled via a "leaky bucket" method, the ARL may be configure to allocate zero tokens to video data, and accordingly, the "leaky bucket" will not overflow and the HDTV packets will not be dropped. Alternatively, the ARL may be configured to completely skip any steps of rate control and directly switch the packet.

An additional function may be performed to authenticate the request. For example, the ISP may wish to rate control traffic to a subscriber unless the subscriber pays additionally for bandwidth (e.g., on-demand video). In the last example, the subscriber may have paid separately for the HDTV. In such a case, switch 304, once it determines that the data type is one, which requires additional bandwidth, may be configured to connect to video server 312, or to an authentication system (not shown), to authenticate that subscriber 306 has paid for the service requiring the additional bandwidth. Based on the results of the authentication, switch 304 may either rate control the data or terminate rate control for the delivery of the HDTV movie. Also, switch 304 may determine the duration of the service purchased and may resume rate control after the movie has been delivered. The authentication may be done by the CPU of switch 304 or, the ARL may be configured to initiate authentication. Once rate control is terminated for a specific service, switch 304 may identify each packet based on the source address. Therefore, data packets with a different source address may be treated separately.

Figure 4:
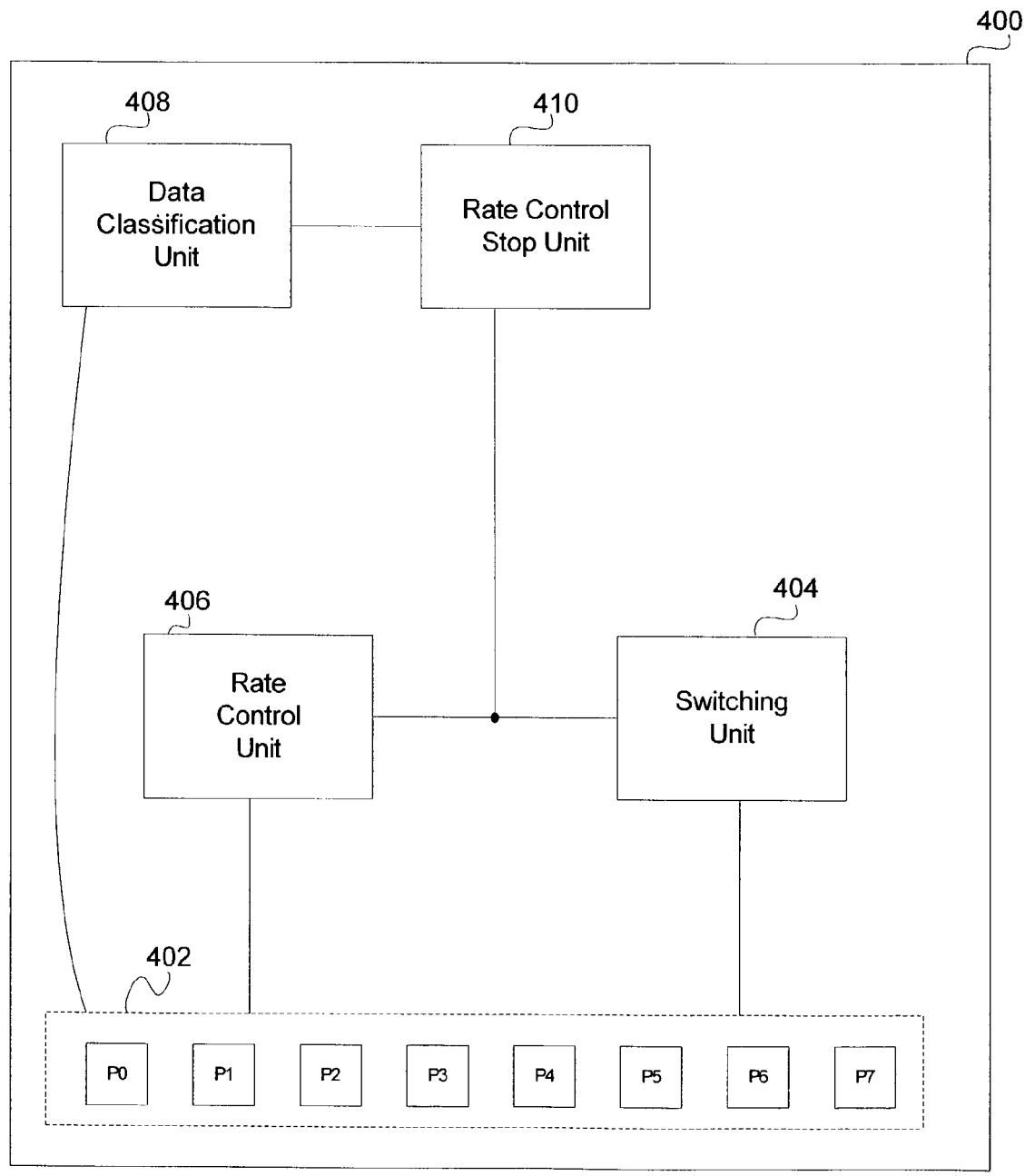
FIG. 4 is a third block diagram of a network including a network device supporting aggregated rate control in accordance with an embodiment of the present invention.

FIG. 4 is a block diagram of an exemplary network device according to an embodiment of the present invention. Network device 400 may be a switch, hub, repeater, or any other network device which may be configurable to perform a network functions as defined herein. Device 400 includes a plurality of network ports 402 which are configured to send and receive signals to other network devices over a network, such as via fiber optics, copper wiring, etc. Accordingly, network ports 402 may be well known PHYs or transceivers. The invention is not limited to any particular physical connection. For instance, the invention may be used in a Digital Subscriber Line Access Multiplexer (DSLAM) application, an Ethernet PHY application, (which may be limited to 100 meters) or a Fiber Ethernet application. The invention may also be used with a Very high bit rate Digital Subscriber Line (VDSL) PHY to establish an Ethernet connection using VDSL or EFM (Ethernet in the First Mile). Device 400 also includes a switching unit 404, a rate control unit 406, a data classification unit 408, and a rate control stop unit 410. Switching unit 404 is connected to ports 402 and is configured to perform various switching functions in relation to signals received at port 402. For example, if device 400 is a network switch, switch unit 404 may contain the necessary hardware and software in order to switch data packets from one port of ports 402 to another port. If on the other hand, that network device 400 is a repeater, switching unit 404 contains the necessary hardware and software in order to repeat a signal received at one port of ports 402 to all the ports 402.

Rate control unit 406 is coupled with ports 402 and switching unit 404, and is configured to perform rate control functions in relation to data packets which are received at ports 402 and being switched, repeated, networked, etc. by switching unit 404. For example, as described above, rate control may be performed in relation to data packets being switched to a particular subscriber in order to limit the bandwidth that the subscribers receive in connection with a subscribers SLA. Such rate control may be performed by the leaky bucket method or any other known rate control means. Rate control unit 406 may include any necessary hardware and software in order to perform rate control functions.

Data classification unit 408 is coupled with ports 402 and with rate control stop unit 410, and is configured to "snoop" data packets being received at any of ports 402. Data classification unit 408 is also configured to classify the type of data being received at each port and transmit this classification to rate control stop unit 410. In response to the classification of any data packet received, rate control stop unit 410 is configured to terminate rate control or modify rate control being performed by rate control unit 406 in connection with the data stream. For example, as described above, rate control can be prevented in relation to data packets which are video or application packets. If rate control is being performed via the leaky bucket method, tokens may be eliminated for such packets, or data packets can be directly switched or routed via switching unit 404. Accordingly, rate control stop unit 410 may be coupled to both rate control unit 406 and switching unit 404 and configured to communicate with rate control unit 406 and switching unit 404.

FIG. 4 is an exemplary block diagram of a network device in accordance with an embodiment of the present invention. One having ordinary skill in the art would readily understand that switching unit 404, rate control unit 406, data classification unit 408, and rate control stop unit 410 may be separate circuits or discrete components, or instead may be logical sub systems within a single IC. For example, referring to FIG. 2, ARL 206, MAC 204, and CPU 210 may individually or collectively each perform the functions of switching unit 404, rate control unit 406, data classification unit 408, and rate control stop unit 410. It should also be understood that the present invention is not meant to be limited to the exemplary configurations shown and described with reference to the drawing figures. Accordingly, the present invention may be applied to other network devices and configurations.

Figure 5:
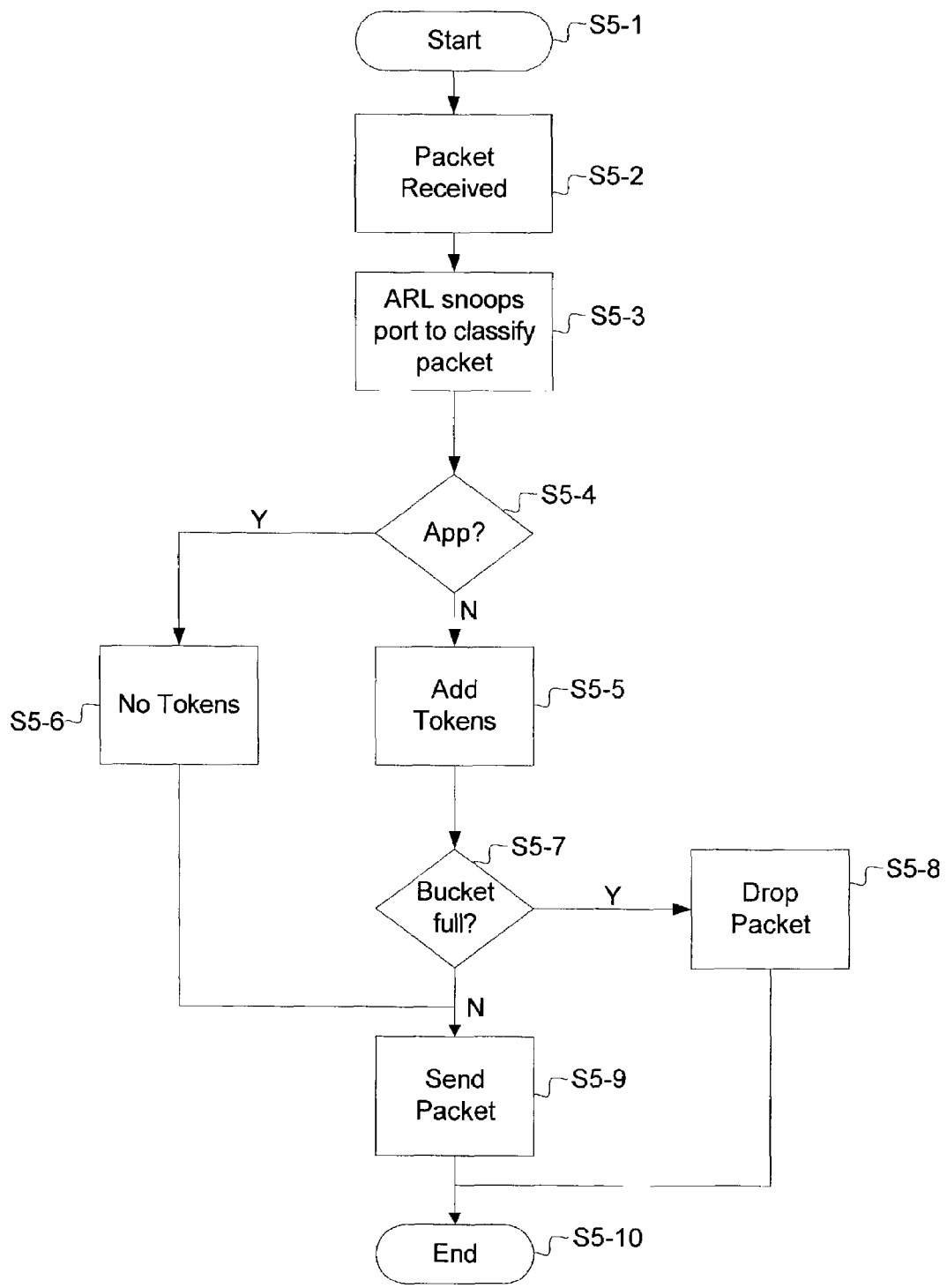
FIG. 5 is flowchart of a method for aggregated rate control according to an embodiment of the present invention.

FIG. 5 is a flow chart of a method of providing aggregated rate control according to an embodiment of the present invention. Processing begins at step S5-1 and proceeds to step S5-2. At step S5-2, a packet is received at a device performing rate control, such as a network switch as described above. The packet may be destined for a subscriber of an ISP, for example, and rate control may be applied to send traffic to that subscriber. As described above, rate control may be applied a number of ways, such as by the leaky bucket method, and may be in accordance with an SLA.

Next, at step S5-3, the type of data is identified. For example, as described above, the port of a switch may be snooped by the ARL of the switch, and the header of the packet may be read to determine the type of data. Certain types of data, such as application data or video data, may require additional bandwidth, or may require additional payments or authentication. Accordingly, the data packet is classified by type.

Next, at step S5-4, the classification may be compared against a list of data types that may be given increased bandwidth. The list may be stored in memory, may be accessed via the network, or the ARL may configured to perform the comparison. For example, video or application data may be types of data that may be given increased bandwidth. If the data received is the type of data that may be given increased bandwidth, then optionally, the service may be authenticated. For example, if the data is video, then the ISP may want to contact the video server to authenticate the service, to ensure that it has been paid for by the subscriber. In the case that it has, the authentication need only be done at the beginning of the data stream, and it can be determined when the service is terminated. If the results of authentication are negative, then rate control may be applied normally at step S5-5.

At step S5-5, rate control is applied to the data packet if it is not of a category receiving increased bandwidth or if authentication fails. Rate control may be applied by any normal means. For example, in a leaky bucket rate control system, the ARL of the switch may calculate a token based on the size of the packet and add it to the bucket. At step S5-7, it is determined whether the bucket is full (or if the imposed bandwidth is exceeded). If the bucket is full or if bandwidth is exceeded, then the data packet may be dropped at step S5-8. Otherwise, the packet is delivered (switched) to the subscriber at step S5-9.

If at step S5-4 the packet is determined to be the kind of data to be afforded increased bandwidth, and if the results any optional authentication performed is successful, then at step S5-6, the data packet is not rate controlled and may be routed directly to the subscriber. For example, in a leaky bucket system, zero tokens are assigned to the packet and processing may proceed to step S5-7 (not shown). Alternatively, the packet may be directly switched to the subscriber at step S5-9. Processing ends at step S5-10.

The above-described method may be performed for each packet received at a switch prior to switching. Once a data packet is assigned higher bandwidth, then the switch may recognize each subsequent packet based on its source address and automatically switch those packets to the customer, in order to increase performance of the switch.

One having ordinary skill in the art will understand that a network device may be configured to perform the above-described method either in silicon or in software. Accordingly, one will understand that the switching configurations described herein are merely exemplary. Accordingly, although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A network device comprising:
   a plurality of network ports, said plurality of network ports configured to send and receive input data packets;
   a switching unit coupled to said plurality of network ports and configured to switch said input data packets from a first port of said plurality of network ports to a second port of said plurality of network ports;
   a rate control unit coupled to said switching unit and configured to control a data rate provided to each port of said plurality of network ports; and
   a data classification unit coupled to said switching unit and said rate control unit, said data classification unit configured to classify said data packets based on the contents of said input data packets and output a classification to said rate control unit;
   wherein said rate control unit is configured to perform rate control for said input data packets based on said classification of each data packet.

2. The network device as recited in claim 1, wherein said rate control unit comprising a leaky bucket classification system.

3. The network device as recited in claim 2, wherein said data classification unit is configured to extract a tag from said input data packets and classifies said input data packets based on said tag.

4. The network device as recited in claim 3, wherein tag is a VLAN tag.

5. The network device as recited in claim 4, wherein said switching unit is configured to insert a tag into said input data packets if no tag exists in said input data packets.

6. The network device as recited in claim 1, wherein said switch unit comprises an address resolution logic (ARL) configured to determine a destination address based on a content of said input data packets, and switch said input data packets to a destination port of said plurality of ports based on said destination address.

7. The network device as recited in claim 1, further comprising a rate control stop unit coupled to said classification unit and said rate control unit, said rate control stop unit is configured to stop said rate control unit from rate controlling said input data packets based on said classification.

8. The network device as recited in claim 7, wherein said data classification unit is configured to classify said input data packets based on a type of said data, said type being video, application, or data, and
   said rate control stop unit is configured to stop said rate control unit from rate controlling said input data packets, if said input data packets are classified as at least one of video data and application data.

9. The network device as recited in claim 7, wherein said rate control unit is configured to calculate an amount of tokens for each of said input data packets.

10. The network device as recited in claim 7, wherein said rate control unit is configured to apply rate control based on a customer service level agreement.

11. The network device as recited in claim 9, wherein said rate control unit is configured to drop data packets of said input data packets that are received during a predetermined period of time which, when tokens for each data packet is summed, exceed a predetermined amount of tokens.

12. The network device as recited in claim 7, wherein said rate control unit corresponds a number of tokens to said input data packets based on a size of said input data packets, sums a number of tokens corresponding to said input data packets in a predetermined period of time, and drops any data packets corresponding to tokens which exceed a predetermined number for said predetermined period of time.

13. The network device as recited in claim 12, wherein said rate control stop unit is configured to control said rate control unit to apply zero tokens to data packets classified as at least one of video or application data.

14. The network device as recited in claim 1, wherein said network device comprises a network switch.

15. The network device as recited in claim 14, wherein said network switch comprises a router.

16. The network device as recited in claim 14, wherein said network switch comprises a hub or repeater.

17. A method of rate controlling data within a network, said method comprising:
receiving a data packet destined for a customer,
classifying said data packet;
rate controlling said data packet based on results of said classification step;
switching said packet to said customer based on said rate controlling step; and
wherein said rate controlling step includes applying rate control to said data packet if said results of said classifying step are a predetermined classification;
and not applying rate control to said data packet if said results of said classifying step are not said predetermined classification.

18. The method as recited in claim 17, wherein said classifying step includes reading said data packet to determine a type of said data packet, and classifying said data packet based on said type.

19. The method as recited in claim 18, wherein said classifying step includes classifying said data packet as at least one of data, application, and video.

20. The method as recited in claim 18, wherein said rate controlling step includes applying rate control to said data packet if said results of said classifying step are not video or application, and not applying rate control to said data packet if said results of said classifying step are one of video and application.

21. The method as recited in claim 19, wherein said rate controlling step further includes associating a number of tokens with said data packet when rate control is to be applied,
summing a number of tokens over a period of time for a plurality of data packets, and
dropping any data packets of said plurality of data packets for which the sum of the number of tokens exceeds a predetermined number of tokens.

22. A network device comprising:
a plurality of ports for sending a receiving input data;
a switching means for switching input data to a first port of said plurality of ports to a second port of said plurality of ports;
a rate control means for applying rate control to said input data received at said plurality of ports into said device;
a data classification means for classifying said data input;
a rate control stop means for stopping said rate control means from applying rate control to said data input based on a classification by said data classification means.

23. The network device as recited in claim 22, wherein said data classification means classifies said input data based on a type of said data, said type being video, application, or data, and
said rate control stop means is configured to stop said rate control means from applying rate control to said input date, if said input data is classified as one of video data and application data.

24. The network device as recited in claim 22, wherein said rate control means is configured to apply tokenized rate control to said input data.

25. The network device as recited in claim 22, wherein said rate control means includes a priority rate control unit.

26. The network device as recited in claim 22, wherein said rate control means applies rate control based on a customer service level agreement.

27. The network device as recited in claim 22, wherein said rate control means drops packets of said input data that are received during a predetermined period of time which exceed a predetermined amount.

28. The network device as recited in claim 23, wherein said rate control means applies tokenized rate control to said input data.

29. The network device as recited in claim 28, wherein said rate control means corresponds a number of tokens to said input data based on a size of said input data, counts a number of tokens corresponding to said input data in a predetermined period of time, and drops any packets corresponding to tokens which exceed a predetermined number for said predetermined period of time.

30. The network device as recited in claim 29, wherein said rate control stop means controls said rate control means to apply zero tokens to data packets classified as one of video or application data.

31. The network device as recited in claim 22, wherein said classification means reads said input data at said plurality of ports before said input data is switched by said switching means, and provides said classification to said rate control stop means.

* * * * *